(12) United States Patent
Lai

(10) Patent No.: US 7,692,886 B1
(45) Date of Patent: Apr. 6, 2010

(54) LENS SEATED DEVICE FOR DRIVING SINGLE LENS REFLEX CAMERA ZOOMING

(75) Inventor: Peng-Cheng Lai, 581 Jay St., Los Altos, CA (US) 94022

(73) Assignee: Peng-Cheng Lai, Irvine, CA (US)

( * ) Notice: Subject to any disclaimer, the term of this patent is extended or adjusted under 35 U.S.C. 154(b) by 0 days.

(21) Appl. No.: 12/262,646

(22) Filed: Oct. 31, 2008

(51) Int. Cl.
*G02B 7/02* (2006.01)
*G03B 17/00* (2006.01)

(52) U.S. Cl. .................... 359/822; 359/811; 396/419

(58) Field of Classification Search ............ 359/822, 359/819, 823, 694, 696, 697, 703, 830; 396/419, 396/422, 428, 429; 348/211.7, 211.9, 240.3, 348/373, 375, 376
See application file for complete search history.

(56) References Cited

U.S. PATENT DOCUMENTS 7,460,319 B2 * 12/2008 Aiba et al. ................. 359/811

* cited by examiner

*Primary Examiner*—Alicia M Harrington

(57) ABSTRACT

A lens seated device for driving a single lens reflex (SLR) camera zooming comprises an adapting ring, a big gear, a small gear, a motor and a chassis. The chassis sustains the SLR camera, the adapting ring, the big gear, the small gear and the motor. The adapting ring clinches around the lens of the SLR camera and is seated and fixed on the big gear. The motor is used for driving and directly rotating the small gear, and then the small gear will drive to rotate the big gear. The rotation of the big gear will drive and rotate the adapting ring accordingly, and thereby drive the lens of the SLR camera for zooming.

10 Claims, 11 Drawing Sheets

15

17

LENS SEATED DEVICE FOR DRIVING SINGLE LENS REFLEX CAMERA ZOOMING

FIELD OF THE INVENTION

The present invention generally relates to a zooming device for a single lens reflex (SLR) camera, and more particularly to a lens seated device for driving a SLR camera zooming, which is disposed outside the SLR camera.

DESCRIPTION OF THE RELATED ART

In general consumer cameras (or compact cameras), lens is zoomed with a gear set and spiral rods. However, there is no automatic lens zooming device for a SLR camera at present. Therefore, the user may only zoom the lens manually, for example holding the lens to rotate.

Some manufacturers equip cameras with software development kits (SDKs) to implement the functions of the cameras such as preview, snap, aperture, shutter, ISO sensitivity, white balance, etc. However, the SDK may be used for zooming the lens of the consumer camera only, so as to realize taking pictures fully automatically by using the consumer camera. Although the SLR cameras become more and more popular, the SLR cameras cannot realize taking pictures fully automatically, since the SDKs lack the function of zooming the lenses of the SLR cameras and also without zooming mechanism in it.

Ordinary persons are apt to design an automatic zooming device for driving the lens of the SLR camera to rotate directly, by coupling a first gear on the lens and using a second gear driven by a motor to drive and rotate the first gear. However, the above-mentioned design is likely to result in lens deflection and gear mismatch. Therefore, the present invention proposes fastening an adapting ring to the lens and seated on and fixed to a big gear, and using a small gear driven by a motor for indirectly driving and rotating the adapting ring via the big gear, so as to indirectly zoom the lens of the SLR camera.

SUMMARY OF THE INVENTION

The present invention is directed to a lens seated device for zooming a lens of a SLR camera, such that the SLR camera may be fully automatically controlled by a SDK and an application software. User may operate the SLR camera to take pictures without touching it by using a control panel or a computer monitor displays all the functions of the SLR camera. Therefore, the SLR cameras can be widely applied to full-automation camera systems.

The present invention provides a lens seated device for driving a SLR camera zooming, which comprises a chassis, an adapting ring, a big gear, a small gear, and a motor. The adapting ring is clinched around the lens and is seated and fixed on a big gear. The motor is used for driving and directly rotating the small gear, and the small gear in turn drives and rotates the big gear. The chassis sustains the related elements of the device and the camera is fixed thereon.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION OF THE INVENTION

Figure 1:
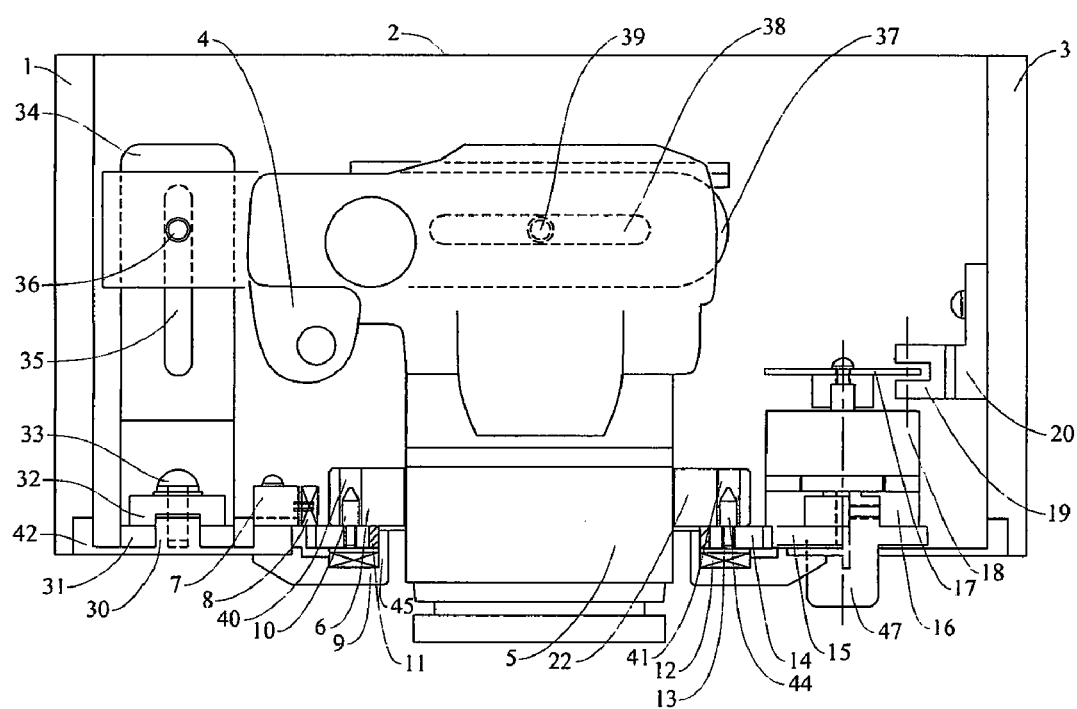
FIG. 1 illustrates a front view of a lens seated device for driving a SLR camera zooming according to an embodiment of the present invention.

Reference will now be made in detail to the present embodiments of the invention, example of which is illustrated in the accompanying drawings. Wherever possible, the same reference numbers are used in the drawings and the description to refer to the same or like parts.

FIG. 1 illustrates a front view of a lens seated device for driving a SLR camera zooming according to an embodiment of the present invention for illustrating the main elements of the invention. As illustrated in FIG. 1, adapting rings 6 and 22 of the device clinch around a lens 5 of a SLR camera 4 and have lock holes 40 and 41 thereon. The adapting rings 6 and 22 are seated on a big gear 14, and lock pins 10 and 44 of the big gear 14 are respectively inserted into the lock holes 40 and 41 of the adapting rings 6 and 22. A motor 18 drives to rotate a small gear 15, and the small gear 15 further drives to rotate the big gear 14, and then the adapting rings 6 and 22 seated on the big gear 14 drive to rotate the lens 5 of the SLR camera 4, so as to zoom in or zoom out the lens 5. The above-mentioned elements are main elements of the invention and all arranged on a chassis 42. A rotating base 9 is arranged below the chassis 42 and fastened upward to the chassis 42. A ring shaft 45 extends upward from the rotating base 9 and may be used as the rotation axis of the big gear 14. In this embodiment, an oilless bush 11 may be arranged in between the big gear 14 and the ring shaft 45. A bearing 8 fixed to a fixing block 7 may be arranged above the big gear 14 to guide the rotation of the big gear 14. A flat needle bearing 13 and a ring type thrust gasket 13 may further be arranged in between the horizontal surfaces of the big gear 14 and the rotating base 9. The motor 18 is fastened to a motor bracket 16. A raster 17 is fastened on the motor 18. A photo sensor 19 fixed to a sensor bracket 20 is arranged adjacent to the raster 17.

Two arc-shaped side covers 1 and 3 are respectively arranged at two opposite sides as illustrated in FIG. 1, and an arc-shaped top cover 2 may cover the SLR camera 4 and the related elements. The position of the SLR camera 4 may be adjusted by camera fixing brackets 31, 34 and 37 cooperated with a guiding block 30 and guiding slots 35, 38 and 43 in the X, Y and Z directions. Thereafter, fixing nuts 32 and fixing screws 33, 36 and 39 may respectively be used to fasten the camera fixing brackets 31, 34 and 37.

Figure 2:
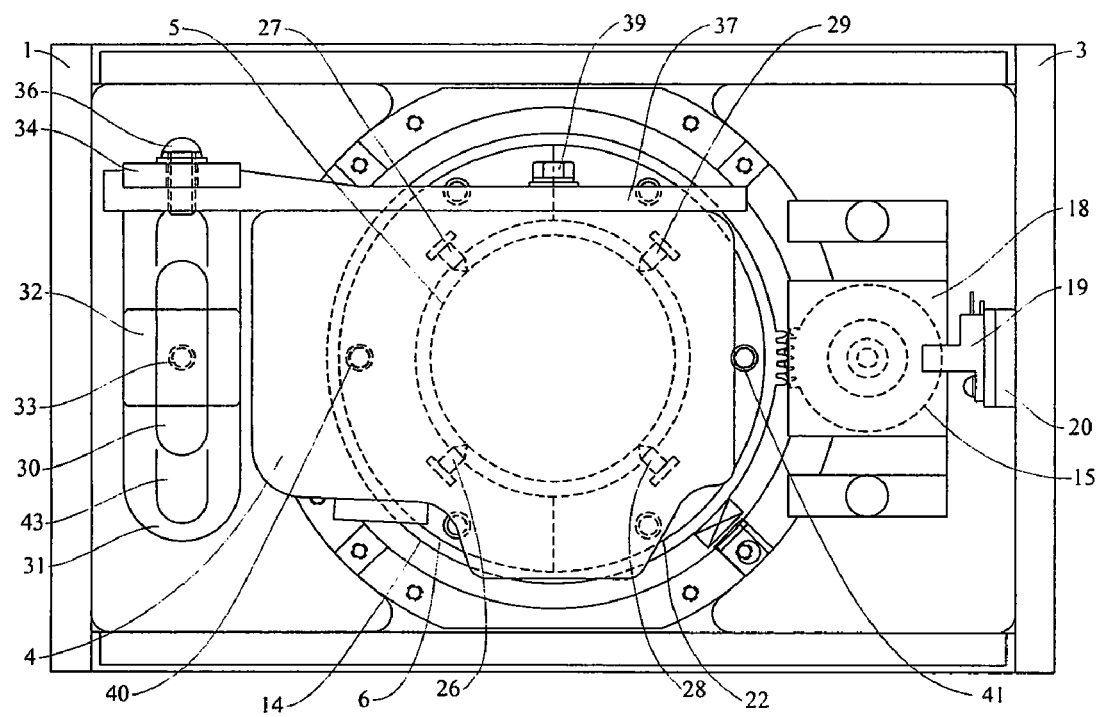
FIG. 2 illustrates a top view of a lens seated device for driving a SLR camera zooming according to an embodiment of the present invention.
Figure 3:
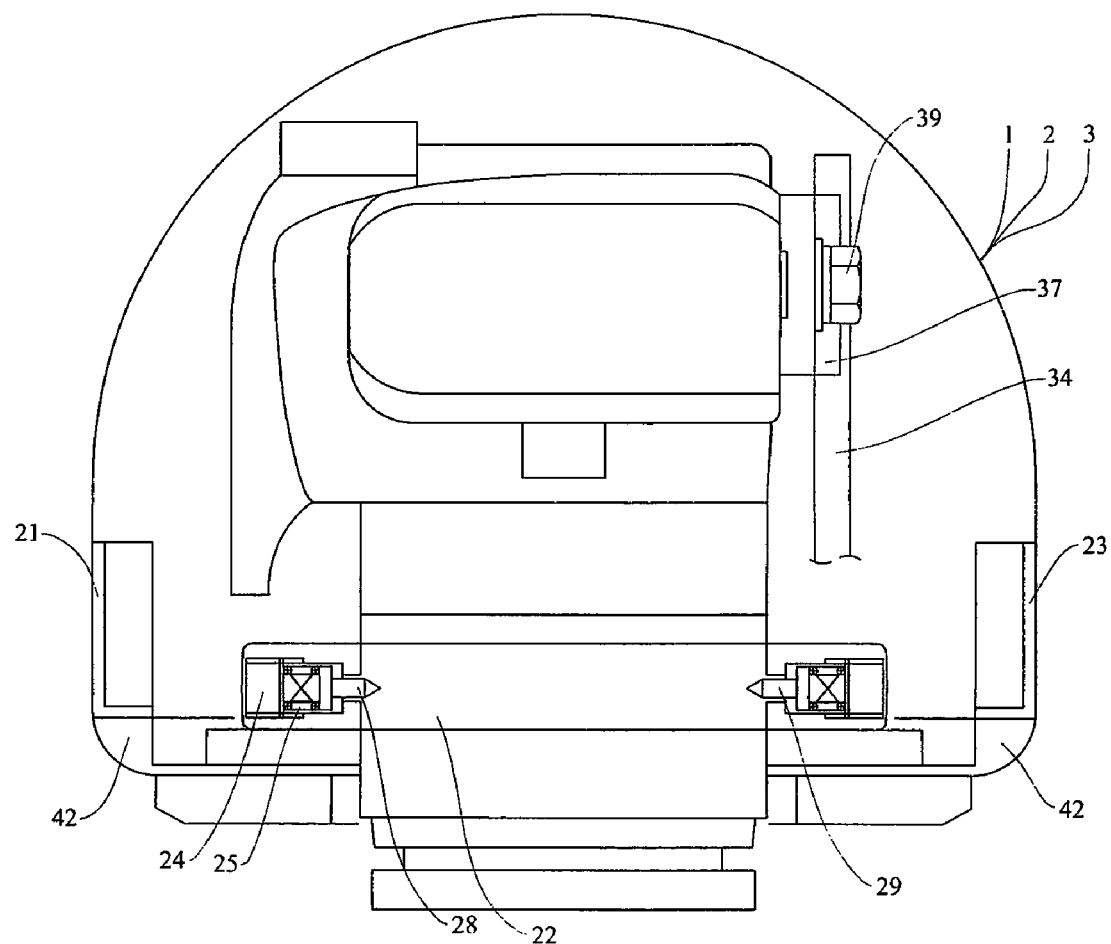
FIG. 3 illustrates a side view of a lens seated device for driving a SLR camera zooming according to an embodiment of the present invention.
Figure 4:
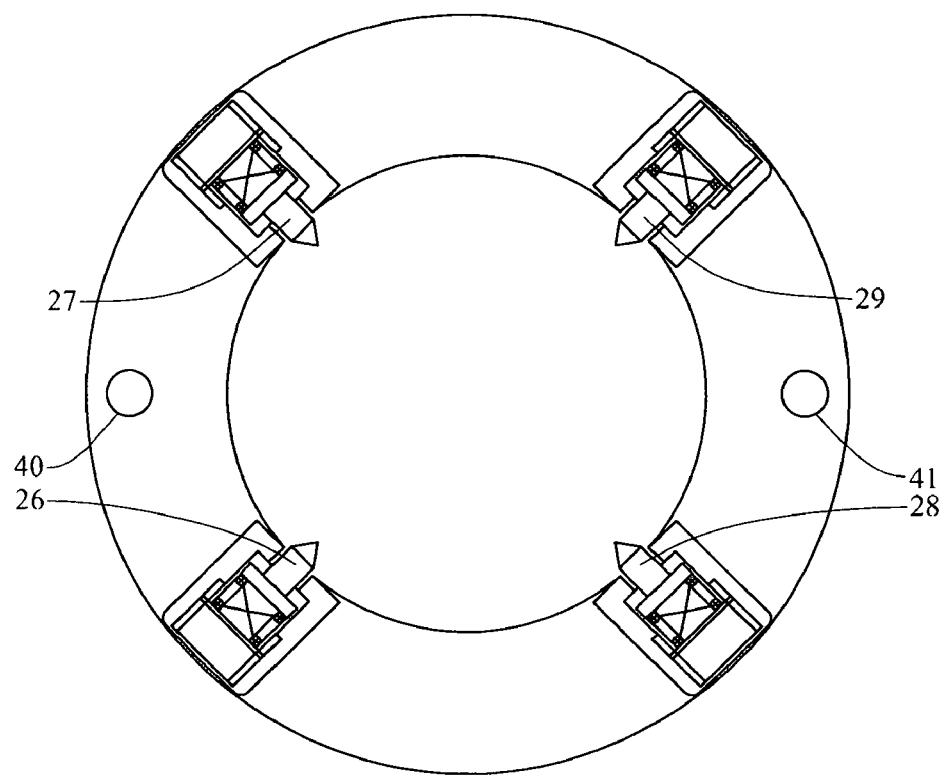
FIG. 4 illustrates a top view of a single ring type adapting ring of a lens seated device for driving a SLR camera zooming according to an embodiment of the present invention.
Figure 10:
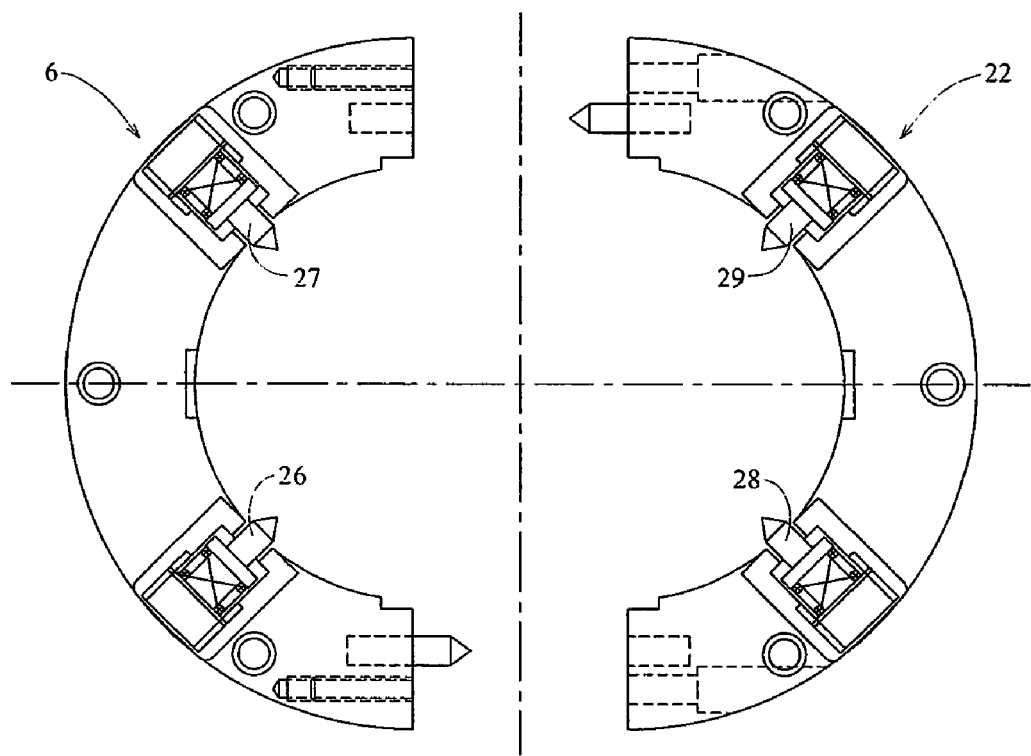
FIG. 10 illustrates a top view of dual semi-circular adapting rings of a lens seated device for driving a SLR camera zooming according to an embodiment of the present invention.

FIG. 2 and FIG. 3 respectively illustrate a top view and a side view of a lens seated device for driving a SLR camera zooming according to an embodiment of the present invention. For simplicity, only several engaged gear teeth of the big gear 14 and the small gear 15 are schematically illustrated in FIG. 2. As illustrated in FIGS. 1, 2 and 3, the lock pins 10 and 44 of the big gear 14 are joined with the lock holes 40 and 41. Clinch needles 26, 27, 28 and 29 are arranged in the inner rim of the adapting rings 6 and 22 and protruded inward to push against the lens 5. The adapting ring may be in the form of not only dual semi-circular adapting rings 6 and 22 as illustrated in FIG. 10 but also a single ring type adapting ring 57 as illustrated in FIG. 4. However in other un-illustrated embodiments, the adapting ring may further be in the form of a plurality of arc-shaped or linear adapting rings. The clinch needles 26, 27, 28 and 29 are pushed out by springs 25 and locked with nuts 24 from the rear sides thereof. A left baffle 21 and a right baffle 23 are joined to the arc-shape top cover 1 and the arc-shape side covers 1 and 3 cover the other two sides to form an enclosed camera housing.

Figure 5:
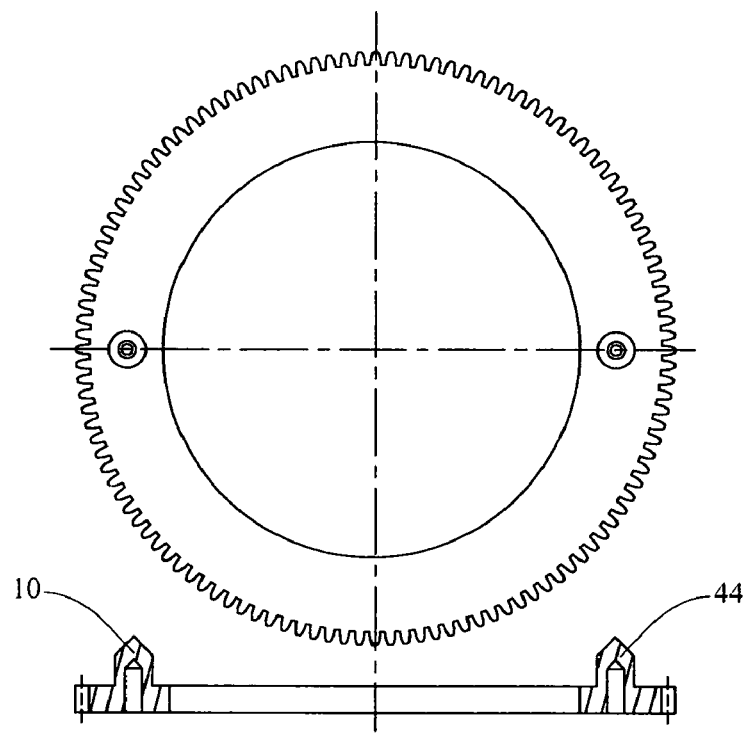
FIG. 5 illustrates a top view and a front sectional view of a big gear of a lens seated device for driving a SLR camera zooming according to an embodiment of the present invention.
Figure 6:
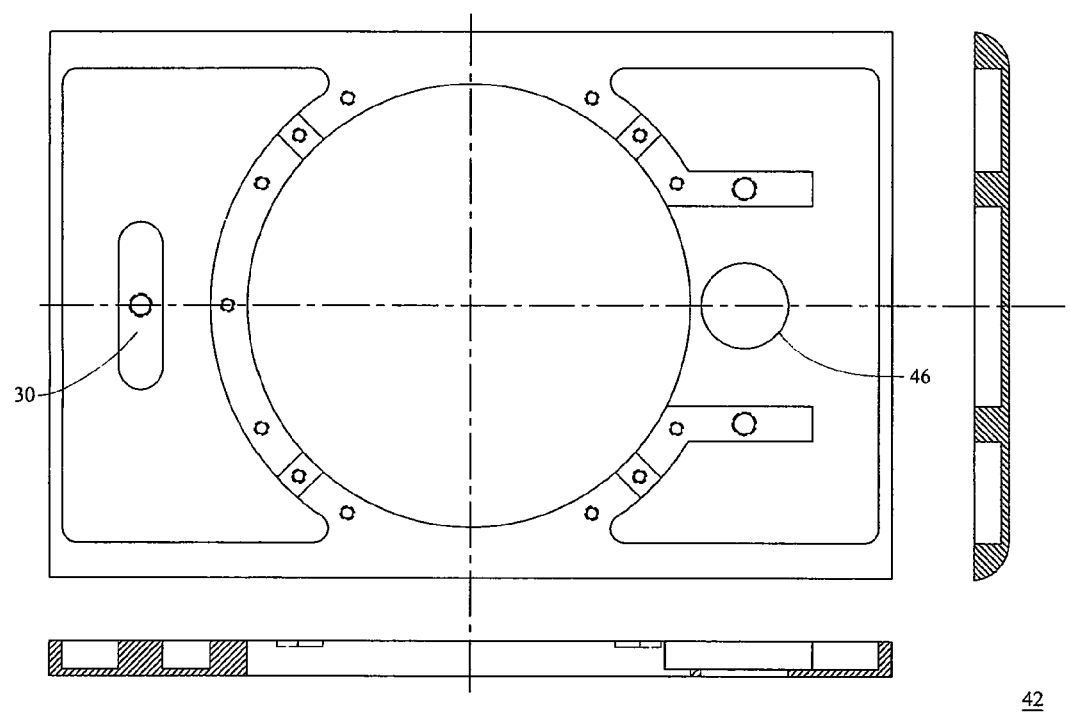
FIG. 6 illustrates a top view, a front sectional view and a side sectional view of a chassis of a lens seated device for driving a SLR camera zooming according to an embodiment of the present invention.
Figure 7:
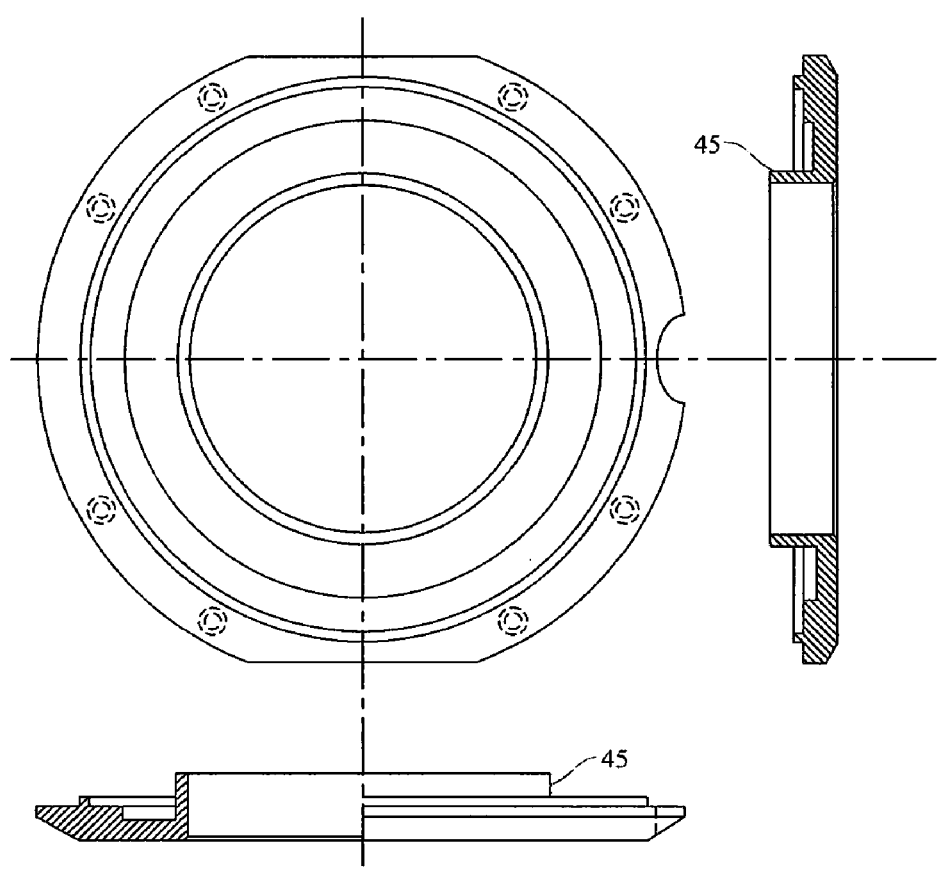
FIG. 7 illustrates a top view, a front view and a side sectional view of a rotating base of a lens seated device for driving a SLR camera zooming according to an embodiment of the present invention.
Figure 8:
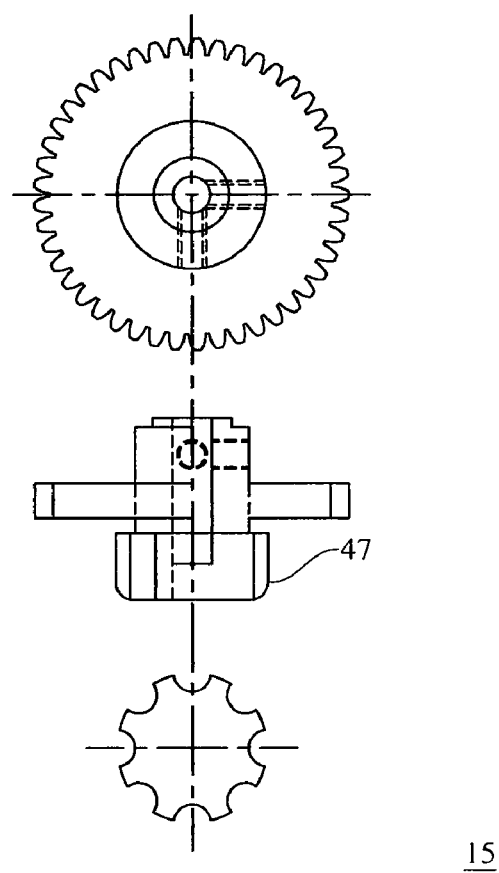
FIG. 8 illustrates a top view and a front view of a small gear and a bottom view of a round turning knob at the lower part of the small gear of a lens seated device for driving a SLR camera zooming according to an embodiment of the present invention.
Figure 9:
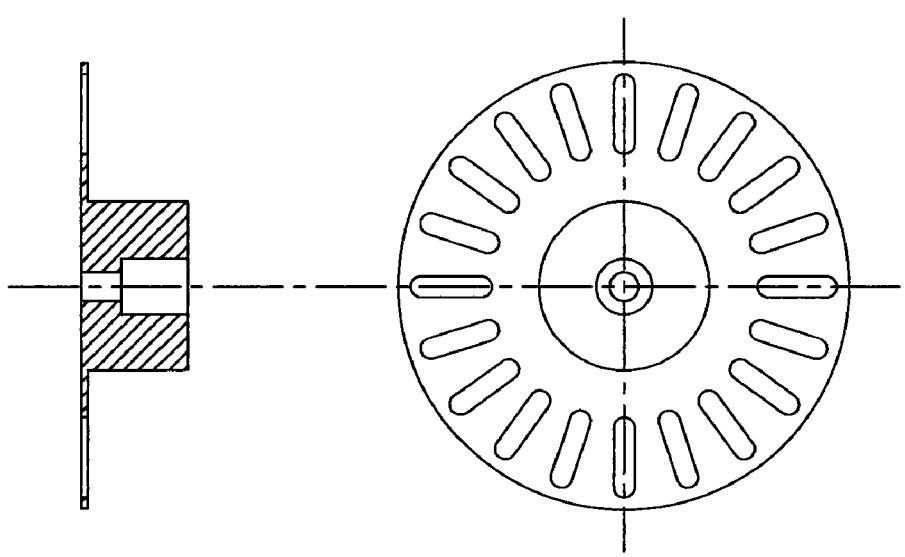
FIG. 9 illustrates a top view and a side sectional view of a raster of a lens seated device for driving a SLR camera zooming according to an embodiment of the present invention.

FIGS. 4-9 illustrate main elements of a lens seated device for driving a SLR camera zooming according to an embodiment of the present invention. FIG. 4 illustrates a top view of the single ring type adapting ring 57 having two lock holes 40 and 41 and four clinch needles 26, 27, 28 and 29. FIG. 5 illustrates a top view and a front sectional view of the big gear 14 having two lock pins 10 and 44 respectively arranged at the left and right sides. FIG. 6 illustrates a top view, a front sectional view and a side sectional view of the chassis 42. As illustrated in FIGS. 1 and 6, the guiding block 30 at the left side of the chassis 42 may be used for guiding the camera fixing bracket 31 to slide, a round turning knob 47 at the lower part of the small gear 15 may pass through a round hole 46 at the right side of the chassis 42 and may be exposed via the bottom of the chassis 42. FIG. 7 illustrates a top view, a front view and a side sectional view of the rotating base 9, wherein the left portion of the front view illustrates the section of the rotating base 9. As illustrated in FIGS. 1 and 7, screws may pass through screw holes of the rotating base 9 from the bottom of the rotating base 9 and fastened to the bottom of the chassis 42, and the ring shaft 45 may be exposed by the center of the chassis 42 for serving as a rotation axis of the big gear 14. FIG. 8 illustrates a top view and a front view of the small gear 15 and a bottom view of the round turning knob 47 at the lower part of the small gear 15. As illustrated in FIGS. 1 and 8, the big gear 14 may be rotated by turning the round turning knob 47 located at the lower part of the small gear 15 and may rotate the adapting ring 6 and 22 secured to the lens 5. Thus the lens 5 may be rotated until the rotation limit thereof. At this time, the position detected by the raster 17 is exactly the initial position of the rotation of the lens 5. FIG. 9 illustrates a top view and a side sectional view of the raster 17. As illustrated in FIGS. 1 and 9, slots of the raster 17 serve as detecting positions to be detected by the photo sensor 19.

Figure 11:
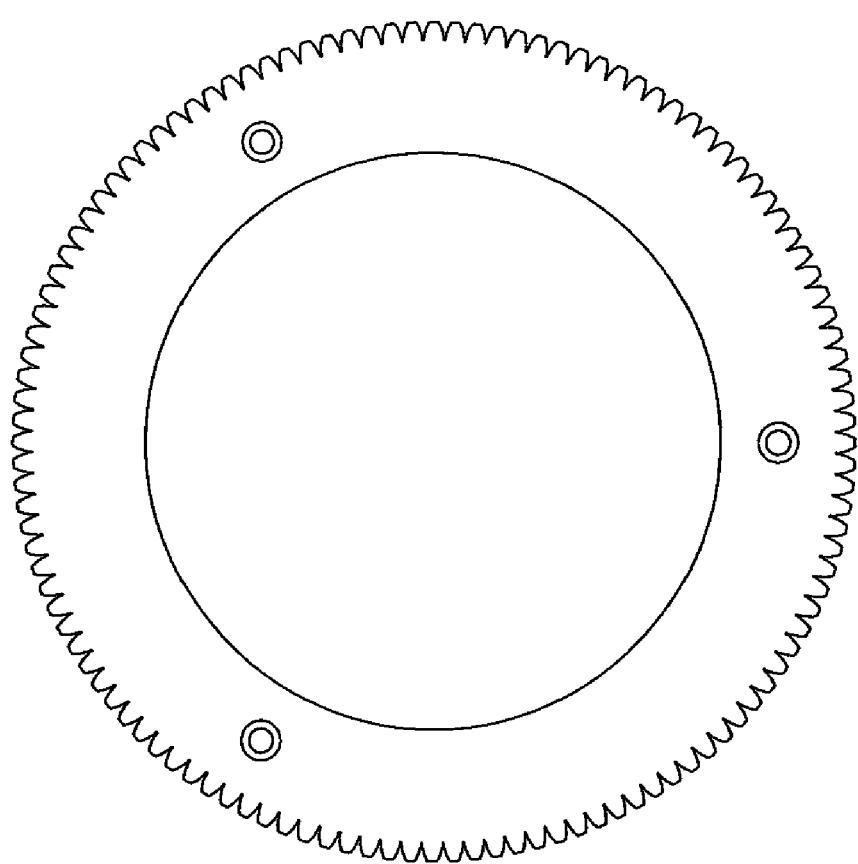
FIG. 11 illustrates a top view of a big gear with tri-lock pins of a lens seated device for driving a SLR camera zooming according to an embodiment of the present invention.

FIG. 10 illustrates a top view of the dual semi-circular adapting rings 6 and 22 of a lens seated device for driving a SLR camera zooming according to an embodiment of the present invention. Each semi-circular adapting ring 6 and 22 has three lock holes instead of two lock holes 40 and 41 as illustrated in FIG. 4. It should be noted that only three out of six lock holes are used when the dual semi-circular adapting rings 6 and 22 are assembled to the big gear 14 as illustrated in FIG. 11, although there are totally six lock holes in the dual semi-circular adapting rings 6 and 22, and the other three lock holes are designed for using a common injection mold to fabricate the two semi-circular adapting rings 6 and 22. Furthermore, the semi-circular adapting ring 6 may have two clinch needles 26 and 27, and the semi-circular adapting ring 22 may have two clinch needles 28 and 29.

FIG. 11 illustrates a top view of a big gear with tri-lock pins of a lens seated device for driving a SLR camera zooming according to an embodiment of the present invention. In this embodiment, three lock pins are instead of the two lock pins 10 and 44 as illustrated in FIG. 5. Thus, the three lock pins can coincide with three lock holes of the adapting rings 6 and 22 as illustrated in FIG. 10 and firmly secure the big gear 14 to support the adapting rings 6 and 22.

Figure 12:
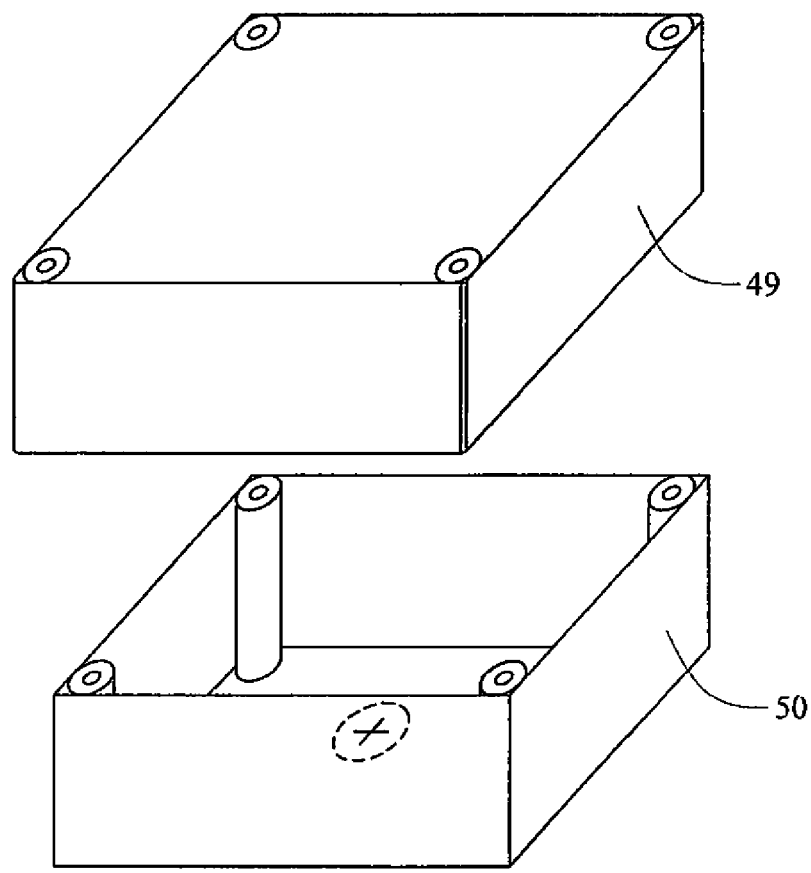
FIG. 12 illustrates a schematic view of a lens seated device for driving a SLR camera zooming according to an embodiment of the present invention, wherein the related elements thereof and the SLR camera are enclosed within the box.

FIG. 12 illustrates a schematic view of a lens seated device for driving a SLR camera zooming according to an embodiment of the present invention, wherein the related elements thereof and the SLR camera 4 as illustrated in FIGS. 1, 2 and 3 are enclosed within the box 48. For simplicity, only the box 48 is presented in FIG. 12, and other elements are omitted. The box 48 includes a cover 49 and a case 50 instead of the enclosed camera housing as illustrated in FIGS. 1, 2 and 3, which is formed by the side covers 1 and 3, the top cover 2, the baffles 21 and 23, and the chassis 42.

Figure 13:
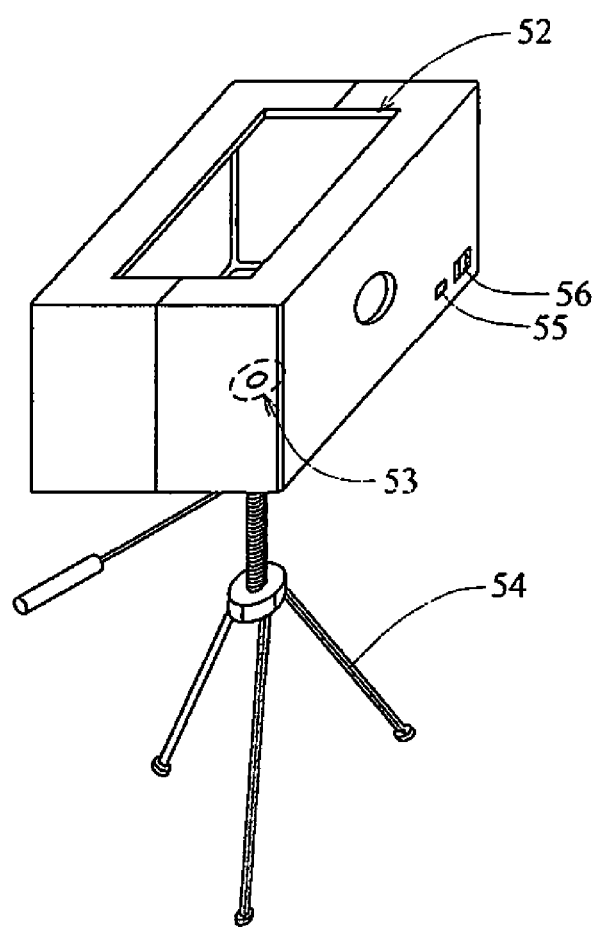
FIG. 13 illustrates a schematic view of a lens seated device for driving a SLR camera zooming according to an embodiment of the present invention, wherein the related elements thereof and the SLR camera are enclosed within the box having an opening on the top thereof and a screw hole on the bottom thereof, and a USB socket and a power socket are disposed on the box.

FIG. 13 illustrates a schematic view of a lens seated device for driving a SLR camera zooming according to an embodiment of the present invention, wherein the related elements thereof and the SLR camera 4 as illustrated in FIGS. 1, 2 and 3 are enclosed within the box 51. For simplicity, only the box 51 is presented in FIG. 12, and other elements are omitted. The box 51 has an opening 52 on the top thereof and a screw hole 53 on the bottom thereof. A flashlight attached to the SLR camera 4 as illustrated in FIGS. 1, 2 and 3 may be exposed by the opening 52. A tripod 54 may be secured to the screw hole 53 at the bottom of the box 51. The box 51 may further include a universal serial bus (USB) socket 55 and a power socket 56.

In summary, the present invention provides a lens seated device for an SLR camera, which is disposed outside the SLR camera to indirectly drive the lens to zoom, wherein the adapting ring is directly seated on the big gear. The motor drives to rotate the small gear and the small gear directly drives to rotate the big gear and indirectly drives to rotate the adapting ring so as to zoom the lens. However, driving the adapting ring clinched around the lens to directly rotate the lens may likely result in lens deflection and inaccurate lens rotation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens seated device for driving a single lens reflex (SLR) camera zooming, comprising
   a chassis for fixing a SLR camera;
   an adapting ring clinching around a lens of said SLR camera;
   a big gear sustained by said chassis, and said adapting ring are seated and fixed on said big gear;
   a small gear sustained by said chassis and engaged with said big gear for driving and rotating said big gear; and
   a motor sustained by said chassis and coupled to said small gear, wherein said motor drives to rotate said small gear and further drives to rotate said adapting ring through said big gear, so as to zoom said lens of said SLR camera.

2. The lens seated device for driving a SLR camera zooming according to claim 1, wherein said adapting ring is fixed on said big gear by press-fit, screws or adhesives.

3. The lens seated device for driving a SLR camera zooming according to claim 1, wherein said adapting ring includes a single ring type adapting ring.

4. The lens seated device for driving a SLR camera zooming according to claim 1, wherein said adapting ring is assembled with at least one plate-like element.

5. The lens seated device for driving a SLR camera zooming according to claim 1, wherein said small gear has a round turning knob, and said chassis has a round hole for exposing said round turning knob.

6. The lens seated device for driving a SLR camera zooming according to claim 1, wherein said chassis has a ring shaft at a center thereof for being a rotation axis of said big gear.

7. The lens seated device for driving a SLR camera zooming according to claim 1 further comprising a box for receiving said SLR camera, said chassis, said adapting ring, said big gear, said small gear and said motor.

8. The lens seated device for driving a SLR camera zooming according to claim 7, wherein said box comprises an opening on a top thereof for exposing a flashlight of said SLR camera.

9. The lens seated device for driving a SLR camera zooming according to claim 7, wherein said box comprises a screw hole on a bottom thereof, and a tripod is capable of being fixed to said box via said screw hole.

10. The lens seated device for driving a SLR camera zooming according to claim 7, wherein said box comprises a socket or an aperture for a universal serial bus (USB) cable or a power cable.

* * * * *